(12) United States Patent
Addis

(10) Patent No.: US 7,717,671 B2
(45) Date of Patent: May 18, 2010

(54) PASSIVE AIR SEAL CLEARANCE CONTROL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 660 days.

(21) Appl. No.: 11/581,525

(22) Filed: Oct. 16, 2006

(65) Prior Publication Data
US 2008/0089783 A1 Apr. 17, 2008

(51) Int. Cl.
*F01D 5/20* (2006.01)

(52) U.S. Cl. ............... 415/173.1; 415/173.2; 415/174.1

(58) Field of Classification Search ............. 415/170.1, 415/173.1, 174.1, 173.2, 173.4, 173.3, 173.5, 415/126, 231, 228, 230
See application file for complete search history.

(56) References Cited

U.S. PATENT DOCUMENTS

| | | | | |
|---|---|---|---|---|
| 3,910,651 A | * | 10/1975 | Pearce et al. ................. | 384/99 |
| 5,203,673 A | * | 4/1993 | Evans ...................... | 415/173.2 |
| 5,350,278 A | * | 9/1994 | Burge ...................... | 416/198 A |
| 6,036,437 A | * | 3/2000 | Wolfe et al. ............... | 415/173.3 |
| 7,059,829 B2 | * | 6/2006 | Garner ..................... | 415/173.7 |
| 7,210,899 B2 | * | 5/2007 | Wilson, Jr. ................ | 415/173.1 |
| 2006/0133927 A1 | * | 6/2006 | Brillert et al. ............ | 415/170.1 |

* cited by examiner

*Primary Examiner*—Edward Look
*Assistant Examiner*—Dwayne J White
(74) *Attorney, Agent, or Firm*—Kinney & Lange, P.A.

(57) ABSTRACT

A seal for restricting leakage of a fluid through a gap disposed between rotating and stationary components concentrically aligned within a gas turbine engine comprises a sealing member and a land. The sealing member is positioned on either the rotating or stationary component of the gas turbine engine and closes a gap between the rotating member and the stationary member. The land is positioned opposite the sealing member on either the rotating or stationary component of the gas turbine engine such that a clearance height is provided between the sealing member and the land. In one embodiment, the land is geometrically shaped according to expected changes in the gap and relative axial position of the sealing member and land during operation of the gas turbine engine. The sealing member and the land are positioned with respect to each other so that the clearance height is maintained approximately constant during operation of the gas turbine engine.

18 Claims, 5 Drawing Sheets

PASSIVE AIR SEAL CLEARANCE CONTROL

BACKGROUND OF THE INVENTION

This invention relates generally to gas turbine engines, and more particularly to passive clearance control systems between components of rotating air seals. Gas turbine engines operate by combusting fuel and compressed air within a combustor to create heated gases with increased pressure and density. The heated gases are used to drive a turbine that turns rotor blades inside a compressor section of the engine, which provides the compressed air used during combustion. The turbine or a second turbine is also typically used to produce rotational horsepower, which can be used to turn a fan to produce thrust, or to turn a generator to produce power. Compressor air is also used to maintain pressure and thrust balances within the engine, or to direct cooling air to various hot sections of the engine. Thus, bleed air is siphoned off the compressor section and directed to other various portions of the engine where it can perform the desired function. Gas turbine efficiency is, therefore, closely linked to the ability of a gas turbine engine to direct air flows within the various engine sections efficiently and without leakage. As such, various air seals are used throughout the engine to maintain air flows and pressure balances.

For example, it is particularly advantageous to maintain the mass flow from the compressor section to the combustor and on to the turbines in order to maintain mechanical and thermal engine efficiency and fuel economy. Compressors and turbines are comprised of alternating stages of vanes and blades that are arranged radially around a center axis to form an axial flow path. The blades are fixed at their inner end to rotating rotors connected to a turbine shaft, and the vanes are suspended from engine casings between the rotating blades. Thus, the rotating blades come into close proximity with the stationary engine casings at their outer end. Conversely, the stationary vanes come into close proximity with the rotating rotors at their inner end. The gap between these rotating and stationary parts, albeit small, permits air to leak out of the flow path, thus reducing the efficiency of the engine. Therefore, in addition to sealing between engine sections along the main flow path, it is necessary to seal the flow path at both the inner and outer radii of the vanes and blades.

Previous attempts to seal the gaps between these and other rotating components include the use of knife edge, labyrinth and brush seals. However, it is difficult to maintain the tight tolerances required with these sealing arrangements due to deformations that the engine undergoes during various stages of operation. For example, during high output requirements of the engine, due to extreme heat conditions, the engine casings grow in diameter due to thermal expansion. Additionally, the turbine shafts grow in length due to thermal growth resulting from the high temperatures reached during operation of the engine. As such, it is difficult to maintain alignment and clearance height between the various seal types, reducing their effectiveness. Thus, a fixed clearance height is typically settled upon that functions adequately for all engine operating conditions, but optimally for few, if any. Solutions to this problem have involved active clearance control systems, which are complex and difficult to accurately control. Therefore, there is a need for an improved clearance control system for components of rotating seals.

BRIEF SUMMARY OF THE INVENTION

The present invention is directed toward a seal for gaps between a rotating component and a stationary component concentrically aligned within a gas turbine engine. The seal comprises a sealing member and a land. The sealing member is positioned on either the rotating or stationary component of the gas turbine engine and closes a gap between the rotating member and the stationary member. The land is positioned opposite the sealing member on either the rotating or stationary component of the gas turbine engine such that a clearance height is provided between the sealing member and the land. In one embodiment, the land comprises a rise corresponding to a change in the gap during operation of the gas turbine engine, and a run corresponding to a change in relative axial position of the sealing member and land during operation of the gas turbine engine. The sealing member and the land are positioned with respect to each other so that the clearance height is maintained approximately constant throughout the operational excursions of the gas turbine engine.

DETAILED DESCRIPTION

Figure 1:
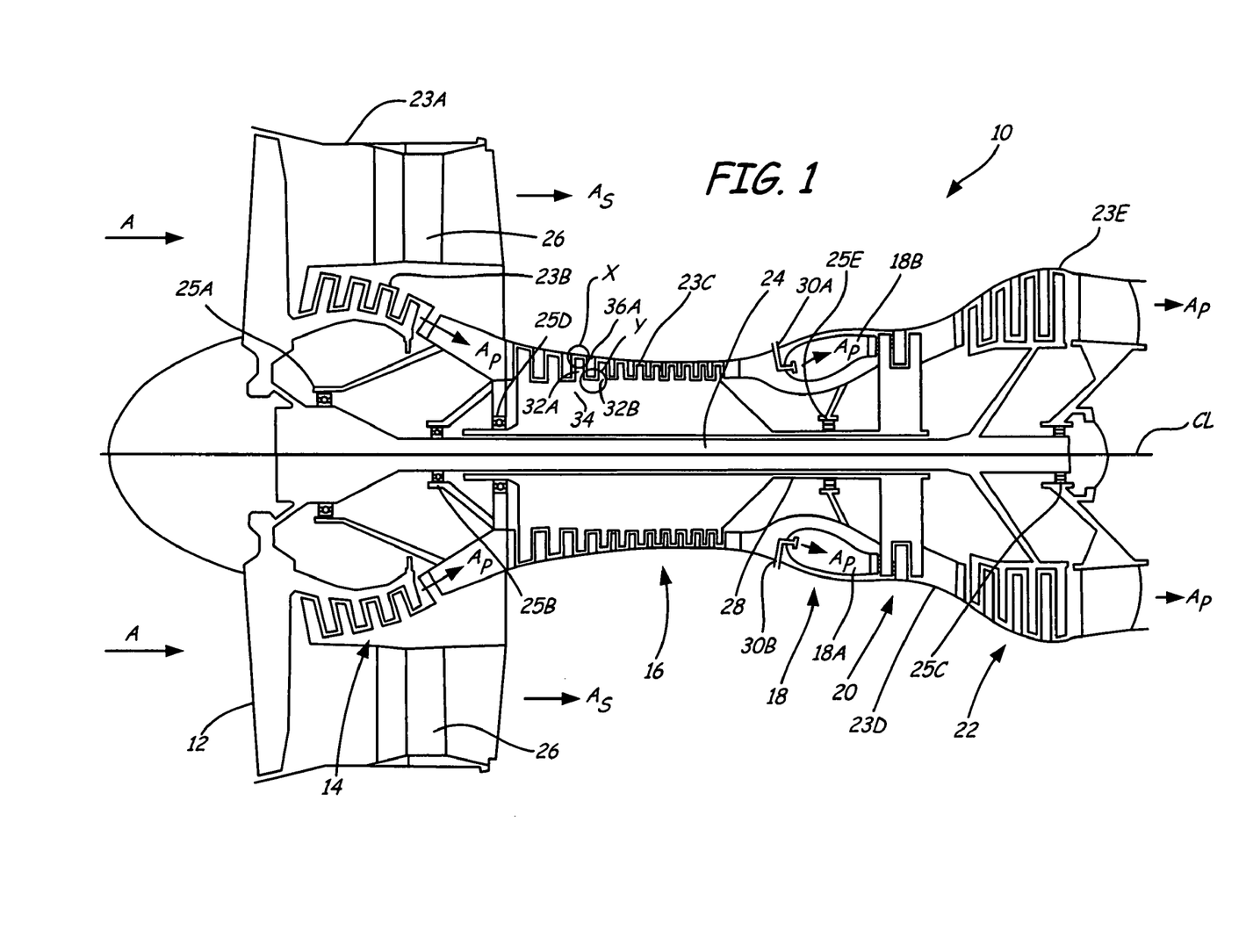
FIG. 1 shows a schematic of a gas turbine engine, in which the passive air seal clearance control system of the present invention is used.

FIG. 1 shows gas turbine engine 10 in which the passive air seal clearance control system of the present invention is used. Although FIG. 1 depicts a gas turbine engine typically used for aircraft propulsion, the invention is readily applicable to gas turbine generators and other similar systems incorporating air seals between rotating and stationary parts. Gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E.

Inlet air A enters engine 10 whereby it is divided into streams of primary air $A_P$ and secondary air $A_S$ after it passes through fan 12. Fan 12 is rotated by low pressure turbine 22 through shaft 24 to accelerate secondary air $A_S$ (also known as bypass air) through exit guide vanes 26, thereby producing a major portion of the thrust output of engine 10. Shaft 24 is supported within engine 10 at ball bearing 25A, roller bearing 25B and roller bearing 25C.

Primary air $A_P$ (also known as gas path air) is directed first into low pressure compressor 14 and then into high pressure compressor 16. LPC 14 and HPC 16 work together to incrementally step up the pressure of primary air $A_P$. HPC 16 is rotated by HPT 20 through shaft 28 to provide compressed air to combustor section 18. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22. Primary air $A_P$ continues through gas turbine engine 10 whereby it is typically passed through an exhaust nozzle to further produce thrust.

In order to maintain the efficiency of the combustion process it is necessary to seal the path along which primary air $A_P$ flows. It is particularly advantageous to seal at the free ends of the blades and vanes of the compressors and turbines. For example, high pressure compressor 16 comprises blades 32A and 32B that extend from rotor 34, which is connected with shaft 28. HPC 16 also includes vane 36A that extends from HPC case 23C between blades 32A and 32B. Thus, a small gap is maintained between blades 32A and 32B and HPC case 23C, such as shown at callout X, and vane 36A and rotor 34, such as shown at callout Y. In order to maintain the mechanical efficiency of engine 10 it is necessary to ensure that the work put into rotating HPC 16 translates into compressing nearly all of the air passing through it such that energy produced from the combustion process is maximized. Thus, any air allowed to escape compression by passing through the gaps at the free ends of blades 32A and 32B and vane 36A reduces the efficiency of engine 10. Various sealing configurations, such as labyrinth, knife edge and brush seals, are provided to seal or reduce air leakage at these gaps. In order to maintain the clearance height of these sealing systems during various operating modes of engine 10, the passive clearance control system of the present invention is provided for in the various seals of engine 10.

Figure 2:
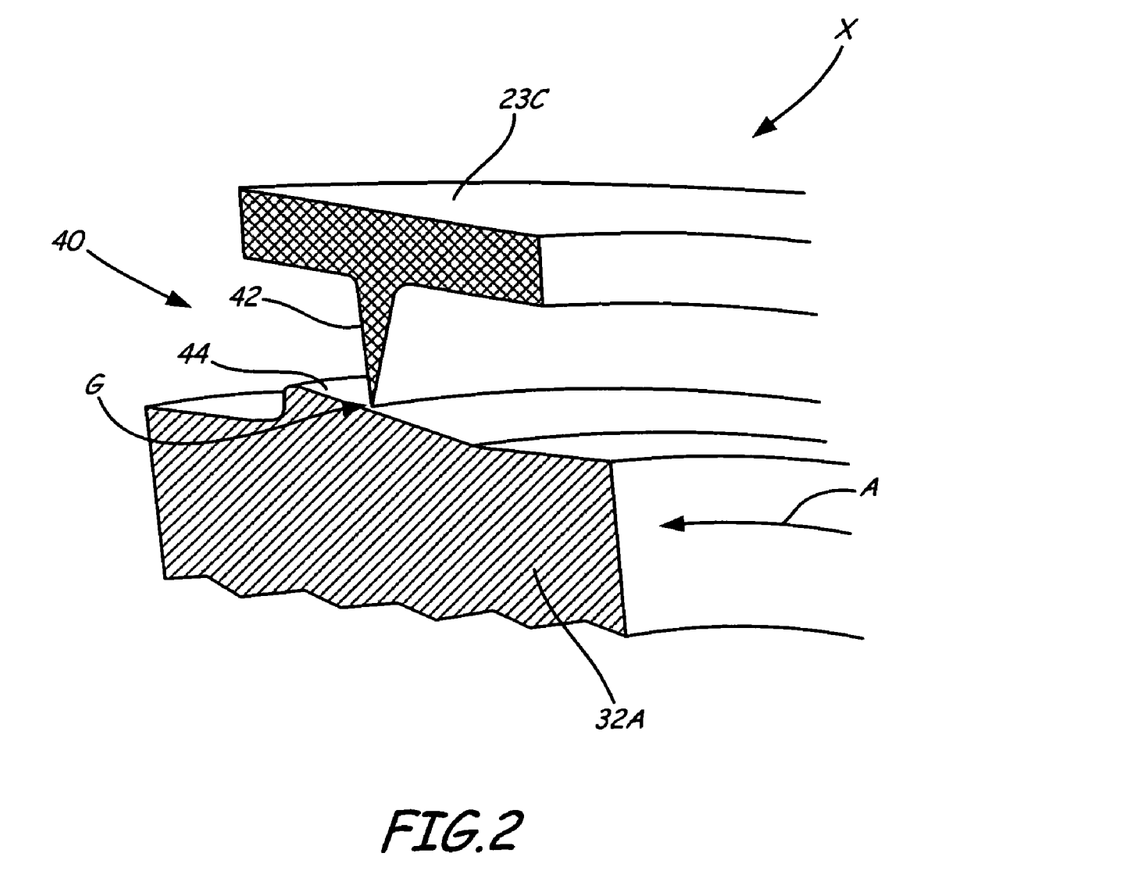
FIG. 2 shows a cutaway, perspective view of a passive air seal clearance control system used in the gas turbine engine of FIG. 1.

FIG. 2 shows a partially cut away view of a passive clearance control system 40 of the present invention, as shown at callout X in FIG. 1. FIG. 2 shows an exemplary embodiment of clearance control system 40 including sealing member 42, which extends from HPC case 23C, and land 44, which extends from HPC blade 32A, or an integral shroud thereof.

HPC blade 32A extends radially from HPC shaft 28 and rotor 34, which run concentrically with engine centerline CL. Thus, HPC blade 32A rotates as it is driven by high pressure turbine 20, as indicated by arrow A. HPC case 23C is mounted to engine 10 concentrically around engine centerline CL and HPC shaft 28 such that it provides a stationary outer barrier around high pressure compressor 16 and blade 32A in particular. In order to increase the efficiency of engine 10 and HPC 16, to ensure that a significant portion of primary air $A_P$ passes through HPC 16 and does not escape at its periphery, clearance control system 40 is provided to seal the space between HPC case 23C and HPC blade 32A.

Sealing member 42 comprises a projection that closes or reduces the gap between a rotating engine component, for example blade 32A, and a non-rotating engine component, for example HPC case 23C. In the embodiment shown, sealing member 42 comprises a knife edge or labyrinth seal, but can be of any suitable construction. In typical knife edge embodiments, sealing member 42 is designed to extend such that it very nearly touches the surface of its mating part, which in system 40 comprises land 44. As such, a desired clearance height is set between sealing member 42 and land 44, as indicated at by arrow G. The clearance height restricts airflow leakage at the interface of the rotating and non-rotating components without significantly increasing friction between the components. Typical knife edge clearance heights are on the order of about $^{10}/_{1000}$" (≈0.0254 cm). But other direct contact seals, such as brush seals, may also be used. Land 44 is geometrically configured such that the desired clearance height is maintained after engine 10 has undergone mechanical and thermal deformations during various operational modes of engine 10.

Typically, engine 10 operates in four basic modes: cold, take-off, cruise and landing, during which various engine components undergo thermal and mechanical growths that affect the size of the clearance height. For example, HPC case 23C typically undergoes various levels of thermal growth thereby undesirably altering the clearance height, which tends to increase the clearance height. In typical engine configurations, the growth of engine components is on the order of $^{60}/_{1000}$" (~0.1524 cm). This is about six times the size of the clearance height, which represents a gross departure from the optimal clearance height. Other factors affecting the size of the clearance height include: centrifugal forces on blade rotors, different thermal expansion rates between the rotating and stationary seal components, and different thermal inputs into engine components.

Additionally, different deformations affect the axial alignment between the rotating and stationary components of the seal system. For example, shaft 28, from which HPC blade 32A ultimately extends, undergoes various levels of mechanical and thermal elongation due to thrust generated during operation of engine 10. Additionally, since the mass of shaft 28 is typically larger than that of other engine components, it undergoes less thermal expansion than smaller fixed engine components. Other factors affecting the magnitude of the axial displacement of the seal components includes: thrust or pressure loading on rotors, different thermal inputs on the stationary and rotating seal components, position of engine and seal components relative to shaft bearings, pressure exerted on compressor vanes and different thermal expansion rates between the rotating and stationary seal components.

For a given engine and a given operating condition the alteration of the clearance height and axial alignment between the seal components can be measured such that a predictable, repeatable pattern emerges. Thus, the seal components can be shaped to take advantage of this known relationship such that the clearance height can be maintained at the different operating conditions of the engine. For example, for each operational mode of engine 10 there could be a corresponding relationship in the thermal growth of case 23C and the mechanical and thermal elongation of shaft 28. This relationship is then correlated in the shape of land 44. For example, for a given expansion of case 23A, sealing member 42 moves a distance further from land 44, for which shaft 28 correspondingly translates land 44 in the axial direction. Thus, the clearance height can be maintained by using the translation of shaft 28 to push land 44 between shaft 28 and HPC case 23C. Land 44 can have any shape, or radial profile, such that it increases the radius of blade 32A in a manner consistent with thermal growth and axial translation of the engine components. In one embodiment, land 44 comprises a ramp or wedge having a particular rise and run corresponding the radial displacement between land 44 and sealing member 42 (e.g. thermal growth of HPC case 23C) and the axial displacement between land 44 and sealing member 42 (e.g.

axial elongation of shaft 28), respectively. However, any geometry having a radially varying length portion can be used based on the determined relationship between the axial and radial translations.

Figure 3A:
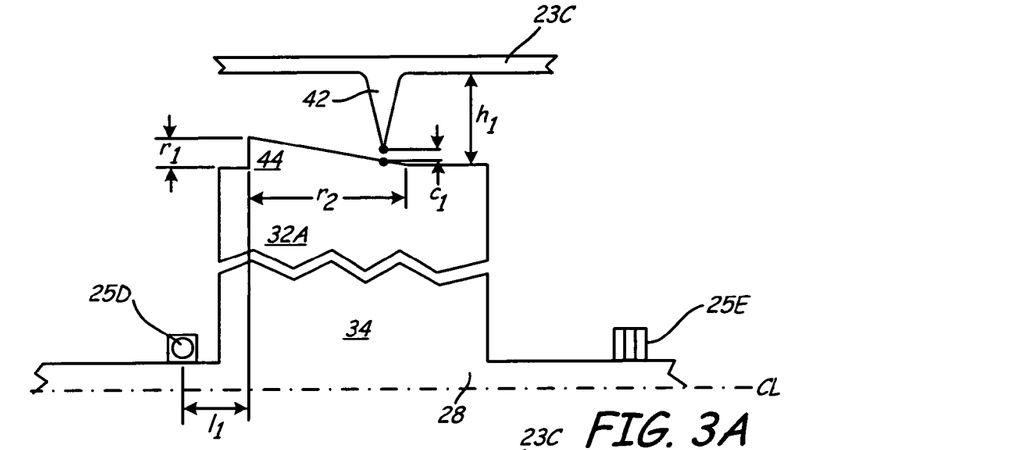
FIG. 3A shows a cross sectional view of the passive air seal clearance control system of FIG. 2 as situated in a cold gas turbine engine.

FIG. 3A shows the relationship between sealing member 42 and ramp 44 of FIG. 2 when engine 10 is in a cold operational mode. HPC case 23C is positioned within engine 10 concentrically around shaft 28 such that it is stationary with respect to shaft 28. Sealing member 42 extends from HPC case 23C toward ramp 44, which extends from shaft 28. Ramp 44 is disposed at the free end of HPC blade 32A, which extends from rotor 34, both of which extend from shaft 28, but have been omitted from FIG. 3A for simplicity. Shaft 28 extends along engine centerline CL and rotates at speeds according to the operational mode of engine 10. As such, FIG. 3A illustrates a typical configuration in which sealing member 42 and ramp 44 can be positioned between rotating and stationary engine components.

Ramp 44, having rise $r_1$ and run $r_2$, is disposed along shaft 28 between bearing 25D and bearing 25E. Bearing 25D, which comprises a ball bearing, is positioned forward of ramp 44 by distance $l_1$. Bearing 25E is positioned aft of ramp 44 and comprises a roller bearing. Shaft 28 includes HPT 20 at its aft end such that during operation of engine 10, shaft 28 is subjected to axial loading. However, when engine 10 is cold, such as when shut down or idling, shaft 28 is at its closest distance to HPC case 23C, as indicated by gap height $h_1$. At height $h_1$, sealing member 42 is positioned clear of ramp 44 by clearance height $c_1$. As demands on engine 10 increase such as for take-off, heat builds up in engine 10 causing thermal expansion of various engine components. The increased thrust and heat also impose axial stresses in various engine components. As such, HPC case 23C and shaft 28 undergo thermal and mechanical deformations that affect the interaction of sealing member 42 and ramp 44.

Figure 3B:
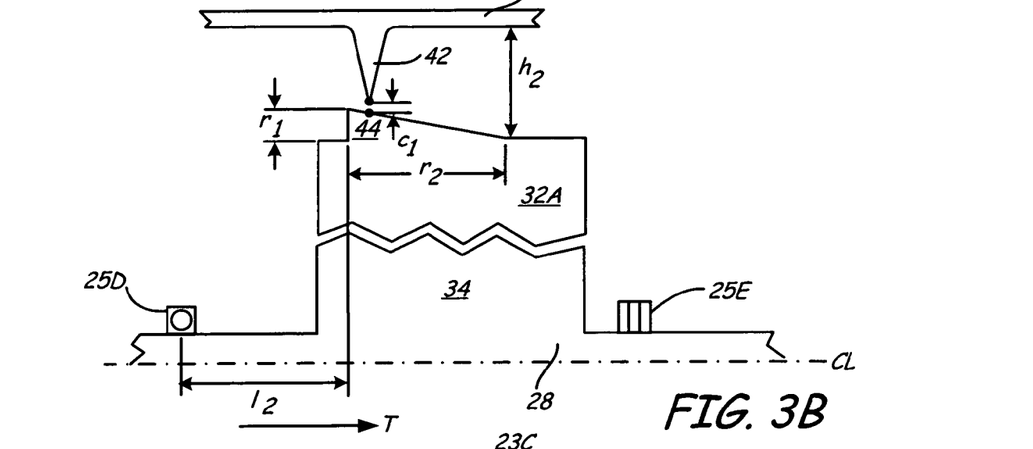
FIG. 3B shows a cross sectional view of the passive air seal clearance control system of FIG. 2 as situated in a gas turbine engine operating at high output.

FIG. 3B shows the relationship between sealing member 42 and ramp 44 when engine 10 is in a take-off or other high output operational mode such as thrust reverse after landing. During take-off, engine 10 is typically operating near its peak thrust output and near its hottest temperatures. Thus, during take-off, HPC case 23C undergoes its peak thermal expansion such that its distance from shaft 28 increases to gap height $h_2$. Clearance height $c_1$, however, is maintained nearly constant by the operation of the axial growth of shaft 28. Due to the thrusting of engine 10, shaft 28 undergoes linear growth in the aft direction, as indicated by arrow T.

Ball bearing 25D provides an anchor point for the growth of shaft 28. Ball bearing 25D is constructed as is well known in the art to provide resistance to axial and thrust loading. Bearing 25D may be of any suitable thrust bearing construction for supporting both radial and axial loading. Roller bearing 25E provides radial support to shaft 28 such that it permits shaft 28 to freely rotate, but does not restrict axial movement of shaft 28. Bearing 25E may be of any suitable bearing construction for supporting radial loading and permitting free axial movement. Generally, shaft 28 only grows in the aft direction from axial thrust produced by engine 10. As such, ramp 44 translates in the aft direction toward sealing projection 42 in a repeatable manner. The closer a sealing feature such as ramp 44 is to thrust bearing 25D, the less lateral translation it will undergo because there is less mass of shaft 28 to expand.

Thrusting loads on shaft 28 increase the length of shaft 28 such that ramp 44 is positioned at distance 12 from ball bearing 25D. Ramp 44 is sloped such that its height decreases in the direction of axial growth of shaft 28. Thus, as ramp 44 moves in the aft direction, toward sealing member 42, the top surface of ramp 44 moves toward sealing member 42 as sealing member 42 is moving radially outward from thermal expansion. Thus, clearance height $h_1$ between sealing member 42 and ramp 44 is maintained.

Run $r_2$ of ramp 44 thus corresponds to the expected mechanical creep of shaft 28 during peak loading on shaft 28 such that ramp 44 includes length enough to maintain clearance height $c_1$ throughout the entire operating range of engine 10. Rise $r_1$ of ramp 44 thus corresponds to the expected thermal deformation of HPC case 23C during peak operation of engine 10 such that ramp 44 includes enough height to maintain clearance height $c_1$ throughout the entire operating range of engine 10. Rise $r_1$, and run $r_2$ may also include additional lengths to compensate for over or under stressing of shaft 28 and over or under thermal expansion of HPC case 23C. In addition to materials, thermal growth and thrust factor, the shape and size of ramp 44 is determined based on the other factors listed above, including: its closeness to thrust bearing 25D, centrifugal forces on blade 32A and rotor 34, and thermal growth of shaft 28 and rotor 34.

As the thrust demands on engine 10 decrease, as engine 10 settles in at cruising operation, thermal expansion of HPC case 23C and thrust stress on shaft 28 relax back toward the cold operating conditions.

Figure 3C:
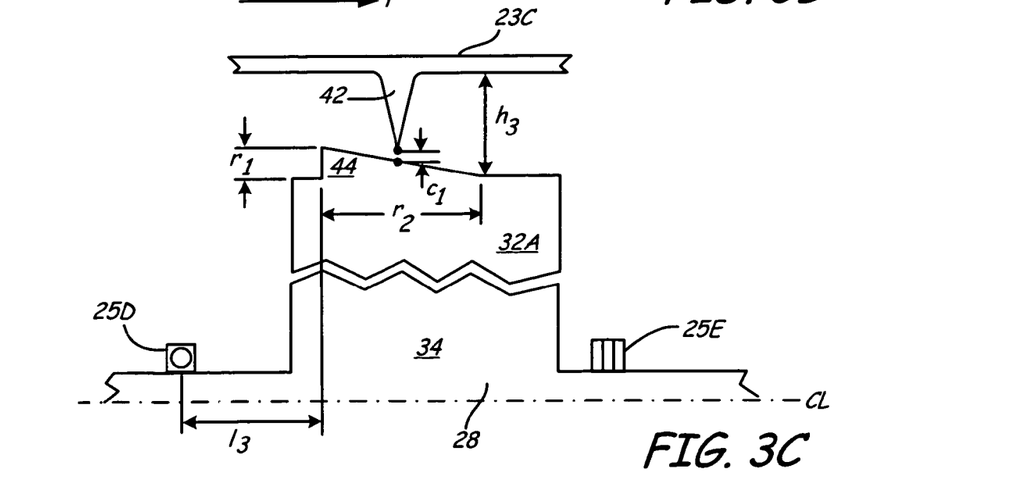
FIG. 3C shows a cross sectional view of the passive air seal clearance control system of FIG. 2 as situated in a gas turbine engine operating under cruise conditions.

FIG. 3C shows the relationship between sealing member 42 and ramp 44 when engine 10 is in a cruising operational mode. Ramp 44 retreats toward bearing 25D to distance $l_3$, and HPC case 23C retracts toward ramp 44 to gap height $h_3$. Ramp 44 retreats and HPC case 23C retract in a corresponding fashion such that sealing member 42 is maintained spaced from ramp 44 at clearance height $c_1$. Thus, clearance control system 40 is able to passively maintain clearance height $c_1$ between sealing member 42 and ramp 44 nearly constant during all operational modes of engine 10. Engine 10 is therefore able to operate more efficiently as less air is able to escape HPC 16 between HPC case 23C and shaft 28.

Figure 4A:
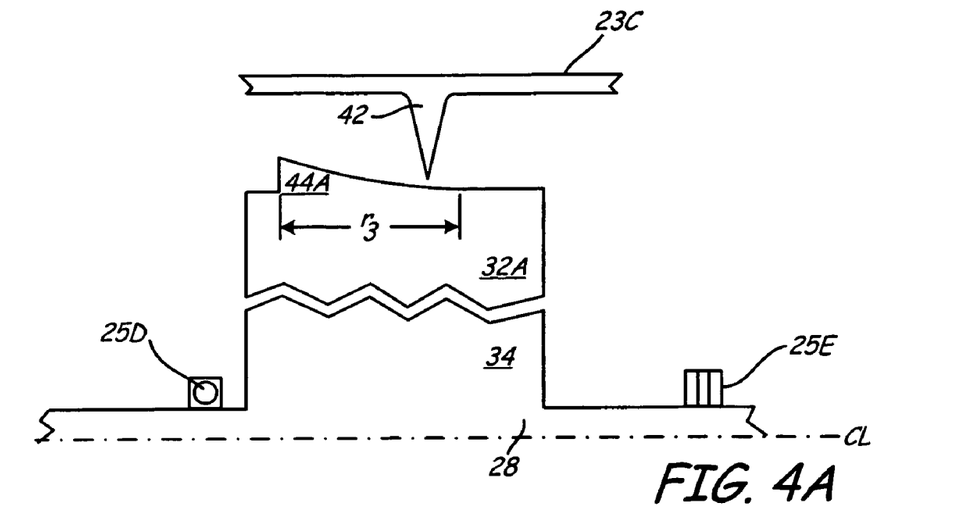
FIGS. 4A and 4B show other embodiments of the passive air seal clearance control system of FIGS. 3A-3C having sealing members of different profiles.
Figure 4B:
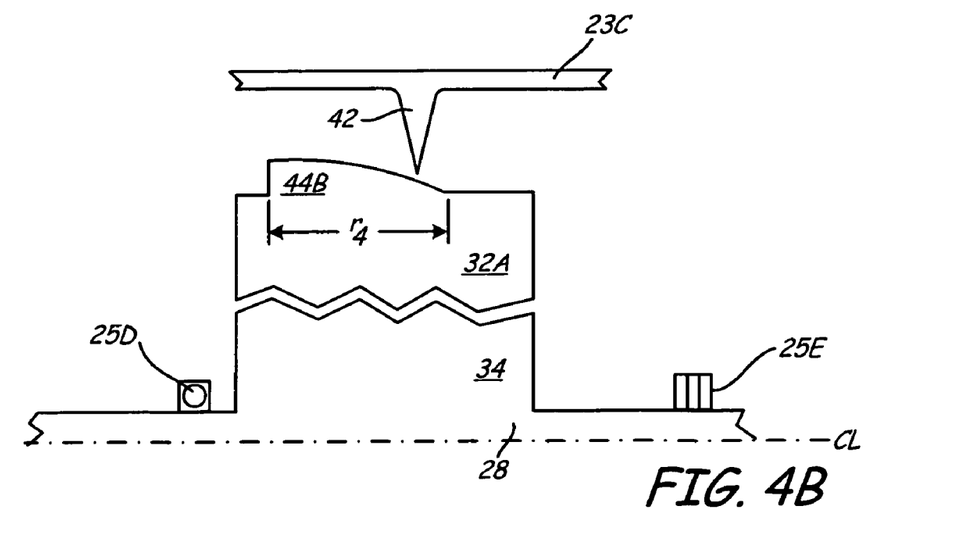

FIGS. 4A and 4B show other embodiments of passive air seal clearance control system 40 of FIGS. 3A-3C having a sealing member with different profiles. Ramp 44 can also have profiles other than triangular or wedge-like to match the expected thermal expansion of combinations of engine components, such as HPC case 23C and shaft 28. For example, FIG. 4A illustrates ramp 44A having run $r_3$ with an exponentially or parabolicly increasing rise as it extends from an aft end to a forward end of shaft, 28. This configuration may be used, for example, in engines that undergo rapid initial thermal expansions such that the clearance height increases rapidly and then levels off. However, FIG. 4B illustrates ramp 44B having run $r_4$ with an exponentially or parabolicly decreasing rise as it extends from an aft end to a forward end of shaft 28. This configuration may be used, for example, in engines that undergo sparse initial thermal expansions such that the clearance height increases slowly and then sharply increases. Thus, the profile of land or ramp 44 can be customized based on the expected shift in engine components taking into consideration various factors that influence the shift.

Figure 5:
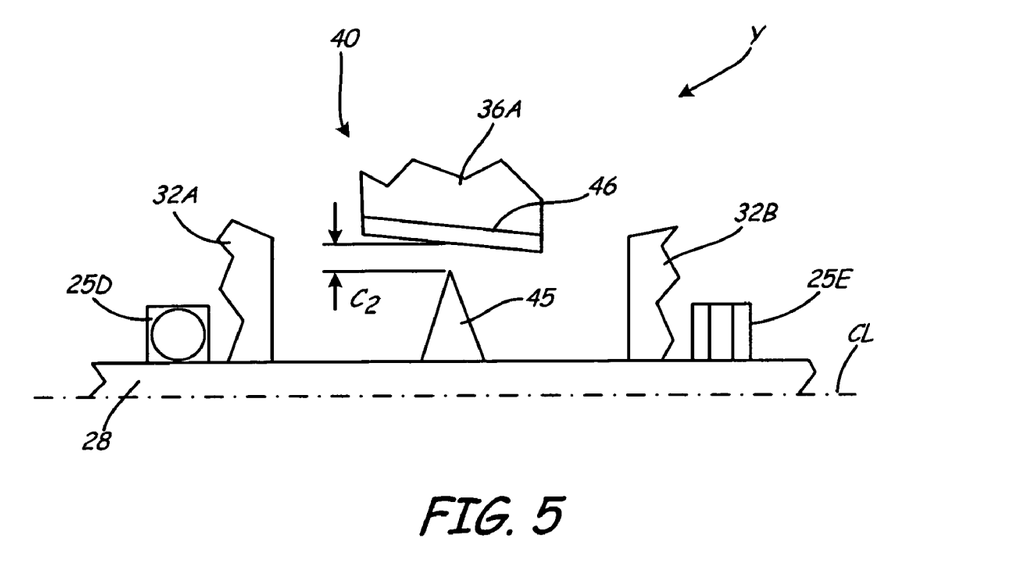
FIG. 5 shows another embodiment of a passive air seal clearance control system including a rotating knife edge seal.

FIG. 5 shows another embodiment of passive air seal clearance control system 40 including rotating sealing member or knife edge 45 such as would be used at callout Y in FIG. 1. Passive air seal clearance control system 40 can be configured such that sealing member 45 is positioned on the rotating or axially translating engine component, and the stationary or thermally expanding engine component includes sloped sealing member 46. Sealing member 46 is positioned at the radially inward end of vane 36A, between blades 32A and 32B.

As described above, HPC case 23C, from which vane 36E extends inwardly from, expands during operation of engine 10 thereby pulling sealing member 46 away from sealing member 45. Shaft 28 continues to creep in the direction of the applied thrust, away from bearing 25E. As such, sealing member is sloped to compensate for the associated expected expansion of clearance height $c_2$ as the gap between blade 36A and shaft 28 grows. Sealing member 46 or vane 36A slopes axially inward in the aft direction, as indicated in FIG. 5. Thus, as sealing member 46 moves away from sealing member 45, and sealing member 45 translates in the aft direction, sealing member 46 slopes toward sealing member 45 to maintain clearance height $c_2$ relatively constant.

The slope of sealing member 46, or any sloped sealing member of the present invention, may be formed with a plurality of methods. For example, sealing member 46 may be comprised of an abradable material built up onto the surface of vane 36A. In other embodiments of clearance control system 40, the shape of the sealing components may be formed of honeycomb material, brazed material, sprayed material, or could be machined directly into the engine component. Sealing member 45 or sealing member 46 may also be integrally formed into the engine component and thereafter coated with an abradable material if desired.

Figure 6:
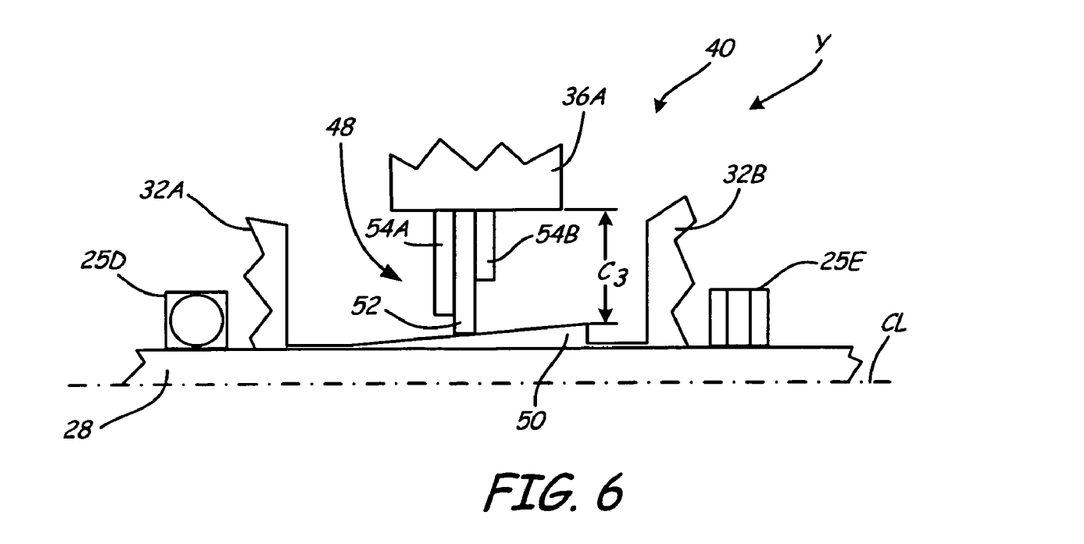
FIG. 6 shows another embodiment of a passive air seal clearance control system including a brush seal.

FIG. 6 shows another embodiment of passive air seal clearance control system 40 such as would be used at callout Y in FIG. 1, including brush seal 48 and ramp 50. Brush seal 48 comprises wire brush 52, which is disposed between stiffening members 54A and 54B. Vane 36A is positioned distance $C_3$ from ramp 50 such that brush 52 maintains a particular contact orientation with ramp 50. For exemplary purposes, ramp 50 is sloped to compensate for constriction of height $C_3$. For example, thermal expansion of various components of engine 10, such as rotor 34, may operate such that vane 36A is brought closer toward ramp 50 as heat builds within engine 10. For example, rotor 34 may expand radially more than HPC case 23C, thereby causing an upward shift of clearance height $C_3$. Shaft 28 will, however, always creep in the direction of the applied thrust, toward bearing 25E. Correspondingly, ramp 50 slopes axially outward as it extends in the aft direction, as indicated in FIG. 4. Thus, as brush 52 moves towards ramp 50, and ramp 45 translates in the aft direction, ramp 45 slopes away from brush 52 to maintain height $C_3$ relatively constant.

Thus, the various embodiments of the present invention provide a passive clearance control system for air seals that can be used in a variety of configurations and axial/radial profiles. The various sealing members and sealing projections, including sealing member 42, land 44 and brush seal 48, can be alternatively positioned on stationary or rotating components. Also, the geometry of the sealing members can be configured to compensate for expanding and shrinking gap heights between the stationary and rotating engine components, such as shaft 28 and casing 23C, such that a desired clearance height is maintained. As such, a variety of axially and radially translating gap heights can be accommodated with the present invention.

Although the present invention has been described with reference to preferred embodiments, workers skilled in the art will recognize that changes may be made in form and detail without departing from the spirit and scope of the invention.

The invention claimed is:

1. A seal for between a rotating component and a stationary component concentrically aligned about an axis of rotation within a gas turbine engine, the seal comprising:
   a radially extending elongate sealing member positioned on either the rotating or stationary component of the gas turbine engine and for closing a radial gap between the rotating member and the stationary member; and
   a land positioned opposite the sealing member on either the rotating or stationary component of the gas turbine engine such that a clearance height is provided between the sealing member and the land; the land comprising:
      a ramp including an axially extending rigid sealing surface wherein a radial distance between the sealing surface and the axis of rotation varies in the axial direction, the surface having:
         a radial rise corresponding to a change in the radial gap during operation of the gas turbine engine; and
         an axial run corresponding to a change in relative axial position of the sealing member and land during operation of the gas turbine engine;
   wherein the sealing member and the land are positioned with respect to each other so that the clearance height is maintained approximately constant during the changes in the radial gap and relative axial position due to thermal expansion and mechanical stress of the engine components arising from operation of the gas turbine engine.

2. The seal of claim 1 wherein the change in the gap during operation of the gas turbine engine is due to radial thermal growth of engine components.

3. The seal of claim 2 wherein the engine components include an engine casing component.

4. The seal of claim 1 wherein the change in relative axial position of the sealing member and land is due to axial thrust loading of an engine component.

5. The seal of claim 4 wherein the engine component comprises a shaft.

6. The seal of claim 5 wherein the shaft is supported by a thrust bearing and a roller bearing such that the sealing member undergoes a predictable expansion from the thrust bearing.

7. The seal of claim 1 wherein the sealing member comprises a labyrinth seal.

8. The seal of claim 1 wherein the sealing member comprises a brush seal.

9. The seal of claim 1 wherein the land comprises an abradable material.

10. The seal of claim 1 wherein the land includes an exponentially shaped surface that is configured to interface with the sealing member.

11. A gas turbine engine seal for maintaining a clearance height between sealing members of a stationary engine component and a rotating engine component, wherein during operation of the gas turbine engine the stationary and rotating engine components undergo a relative axial and radial movement, the sealing members comprising:
   a radially extending elongate sealing projection for narrowing a radial gap between the engine components; and
   a seal land opposing the sealing projection and comprising an axially extending and radially varying ramp profile having a rise and a run configured to maintain the clearance height between the engine components during the relative movement arising from thermal expansion and mechanical stress of the engine components.

12. The gas turbine engine seal of claim 11 wherein the stationary engine component and the rotating engine component are concentrically disposed about an engine axis.

13. The gas turbine engine seal of claim 12 wherein the relative movement comprises:
   an axial displacement between the components; and
   a radial displacement between the components.

14. The gas turbine engine seal of claim 11 wherein the rise corresponds to a change in the gap due to the relative radial displacement of the engine components.

15. The gas turbine engine seal of claim 11 wherein the run corresponds to a change in relative axial displacement of the sealing projection and seal land due to the relative movement of the engine components.

16. The gas turbine engine seal of claim 11 wherein the rotating engine component comprises a shaft supported by a thrust bearing and a roller bearing such that the shaft undergoes a predictable expansion from the thrust bearing.

17. A passive clearance control system for a gas turbine engine, the passive clearance control system comprising:
- a land radially disposed about a shaft in a gas turbine engine;
- a thrust bearing positioned along a length of the shaft such that the shaft undergoes an axial displacement from the bearing due to thermal expansion and mechanical stress of the shaft arising during engine operation; and
- a radially extending elongate sealing member secured to a stationary engine component and for interacting with the land to provide a seal having a clearance height between the shaft and the stationary engine component;
- wherein the stationary engine component undergoes a radial displacement from the shaft due to thermal expansion of the engine component arising during engine operation; and
- wherein the land comprises a radially varying ramp including an axially extending sealing surface wherein a radial distance between the sealing surface and an axis of rotation varies in the axial direction, the surface having a rise and a run for maintaining the clearance height between the land and the sealing member during the radial and axial displacements of the shaft and engine component, the rise corresponding to a change in the radial displacement and the run corresponding to a change in the axial displacement.

18. The passive clearance control system of claim 17 wherein during operation of the gas turbine engine the land translates axially with the shaft to engage the sealing member as the sealing member moves radially relative to the shaft to maintain the clearance height.

* * * * *